April 14, 1953 G. W. JOHNSON 2,634,442
EGG WASHER

Filed Sept. 23, 1946 4 Sheets-Sheet 1

INVENTOR,
Gordon W. Johnson.
BY Roy E. Hamilton,
Attorney.

INVENTOR,
Gordon W. Johnson.
BY Roy E. Hamilton,
Attorney.

INVENTOR,
Gordon W. Johnson.
BY
Roy E. Hamilton,
Attorney

April 14, 1953 G. W. JOHNSON 2,634,442
EGG WASHER
Filed Sept. 23, 1946 4 Sheets-Sheet 4

INVENTOR.
Gordon W. Johnson
BY Roy E. Hamilton,
Attorney.

Patented Apr. 14, 1953

2,634,442

UNITED STATES PATENT OFFICE 2,634,442

EGG WASHER

Gordon W. Johnson, Raytown, Mo., assignor to Gordon Johnson Company, Kansas City, Mo., a corporation of Missouri Application September 23, 1946, Serial No. 698,856

13 Claims. (Cl. 15—3.14)

1

This invention relates to new and useful improvements in egg washers, and has particular reference to egg washers wherein the eggs are supported on moving belts.

The principal object of the present invention is the provision of an egg washer wherein eggs supported on sloping moving belts are urged toward and rotated against substantially stationary scrubbing members.

Another object of the present invention is the provision of non-planar surfaces on said belts whereby an oscillatory or rocking motion is imparted to the eggs supported on said belts, thereby subjecting all portions of the egg surface to the action of said scrubbing means.

Further objects are simplicity and economy of construction, and ease and efficiency of operation.

With these objects in view, as well as other objects which will appear during the course of the specification, reference will be had to the drawings, wherein.

Figure 1:
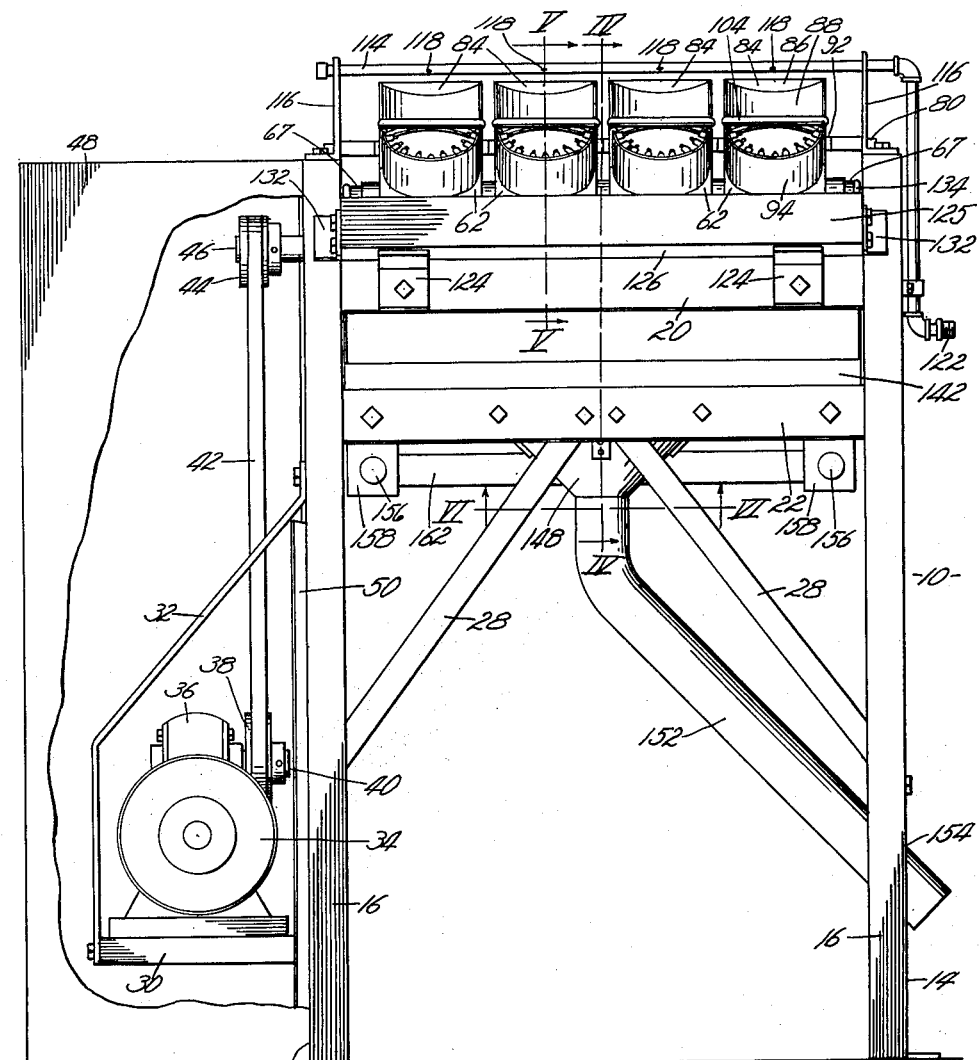
Figure 1 is a front view of an egg washer embodying the present invention, partially broken away to show the motor and belt drive.
Figure 7:
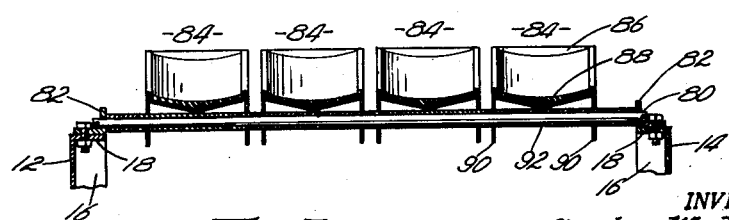
Fig. 7 is a fragmentary vertical section taken on line VII—VII of Figure 2.

Like numerals refer to similar parts throughout the several views, and the numeral 10 refers to a frame comprising a left end panel 12, a right end panel 14, each of said end panels having inwardly extending flanges 16 along the side edges thereof and an inwardly extending flange 18 along the upper edge thereof; an upper front cross member 20; a lower front cross member 22; an upper rear cross member 24; and a lower rear cross member 26, all of said cross members being formed of angle iron and extending between said end panels, being rigidly attached at opposite

2 ends to flanges 16 of said end panels. Said frame is braced by a plurality of braces 28, rigidly fixed at their upper ends to lower cross members 22 and 26, and extending angularly downwardly to fasten securely at their lower ends to end panels 12 and 14.

Rigidly fastened to the outer surface of left side panel 12 at a position adjacent its lower edge is a shelf 30, said shelf being strengthened by a brace 32 rigidly fastened at its lower end to the outer edge of said shelf and fixed at its upper end to end panel 12. Mounted on said shelf is a motor 34, to which is directly attached a gear reducer 36. A pulley 38, rigidly mounted on an output shaft 40 of said gear reducer is operatively connected by means of belt 42 with pulley 44 mounted on the extended left end of shaft 46. Said shelf, motor, pulleys and belt are covered by means of motor cover 48, said motor cover being removably attached to end panel 12 by means of fasteners 50. Handles 52 are provided on said motor cover for ease of handling.

Shaft 46, extending inwardly through hole 54 in left end panel 12 is carried for rotation by bearings 56, said bearings being rigidly mounted on bearing supports 58 rigidly fixed to the inner faces of end panels 12 and 14 in a forwardly inclined position. Said shaft has a portion 47 of larger diameter between said bearings, and is prevented from moving longitudinally through said bearings by means of bushings 60.

Shaft 46 is operatively connected, by means of a plurality of belts 62 of rubber or other resilient material, with shaft 64, shaft 64 being of substantially equal diameter with shaft 47, and having end portions 66 of reduced diameter carried for rotation by bearings 68. Longitudinal movement of shaft 66 through said bearings is prevented by bushings 67. Each of said bearings is rigidly attached to a bar member 70, slidably supported by bearing support 58. Through the upwardly bent rearward end of said bar members are threaded tension screws 72, the opposite ends of said screws passing through upper rear cross member 24 and through flanges 16 of end panels 12 and 14. By turning said tension screws, bearings 68 may be slidably moved along bearing supports 58, thereby tightening or loosening belts 62.

Belts 62 are maintained in spaced relationship along shafts 47 and 64 by means of a plurality of spacer rods 74 extending upwardly between the lower reaches of said belts, and firmly attached at their lower ends with cross member 76, rigidly attached to bearing supports 58.

Formed in the outer surface of each of said belts is a shallow serpentine groove 78.

On a shaft 80, carried in brackets 82 rigidly mounted on top flanges 18 of end panels 12 and 14, are tiltably mounted a plurality of egg holding members 84, each of said egg holding members being positioned in operative relationship above a belt 62 and substantially parallel to the inclined upper reach of said belt.

Figure 8:
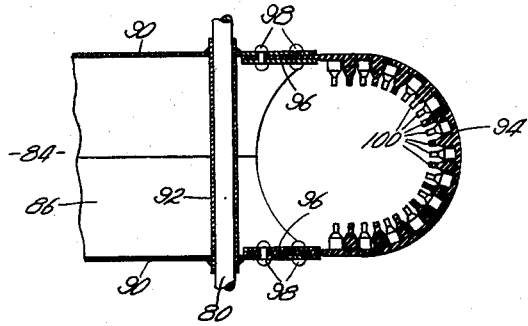
Fig. 8 is a fragmentary section taken on line VIII—VIII of Figure 5.
Figure 3:
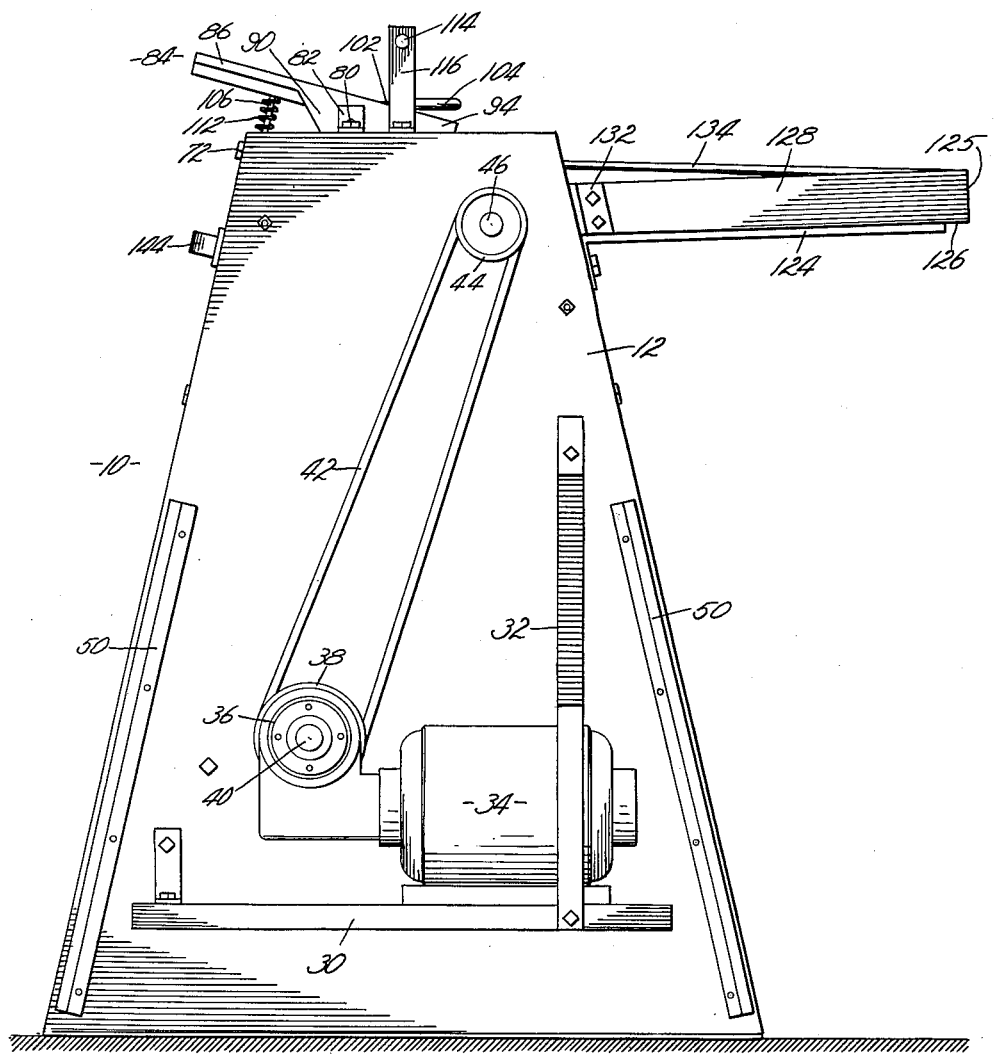
Fig. 3 is a left side view of the egg washer with the motor cover removed.

Each of said egg holding members comprises a concave tray 86 to the upper concave surface of which is cemented a layer 88 of soft rubber or other resilient material; downwardly extending side flanges 90 adjacent the forward end of said tray; a bearing tube 92 extending through and rigidly attached to said flanges, said tube being adapted to be rotatably mounted on shaft 80; and a substantially semi-circular flexible or elastic member 94 extending forwardly from said tray, each end of said belt being rigidly attached between one of flanges 90 and a clamp plate 96 by means of rivets 98, as shown in Figure 8. Said member has a high degree of flexibility. Integrally formed with said flexible member and extending inwardly from the inner surface thereof are a plurality of resilient scrubbing fingers 100. A substantially semi-circular guard rail 102, the ends of which are fixed to opposite sides of tray 86 at points adjacent the forward end of said tray, extends forwardly and angularly upwardly substantially above the loop formed by member 94. Said guard rail is provided with a tubular covering 104 of rubber or other soft material.

Each egg holding member 84 is yieldably maintained at the proper angle of inclination on shaft 80 by means of a bolt 106, fixed at its upper end to tray 86 at a point intermediate shaft 80 and the rearward end of tray 86, and extending at its lower end through elongated hole 108 in upper rear cross member 24, where it is retained by nut 110. A compression spring 112 is retained on said bolt between said tray and said cross member. Said egg holding member is thereby adapted to be tilted to the position shown in dotted lines in Figure 4 by manually depressing the rearward end of tray 86, thereby advancing bolt 106 through hole 108 and compressing spring 112. The angle of tilt of said egg holding member may be adjusted by moving nut 110 along bolt 106.

Figures 4, 5, 6:
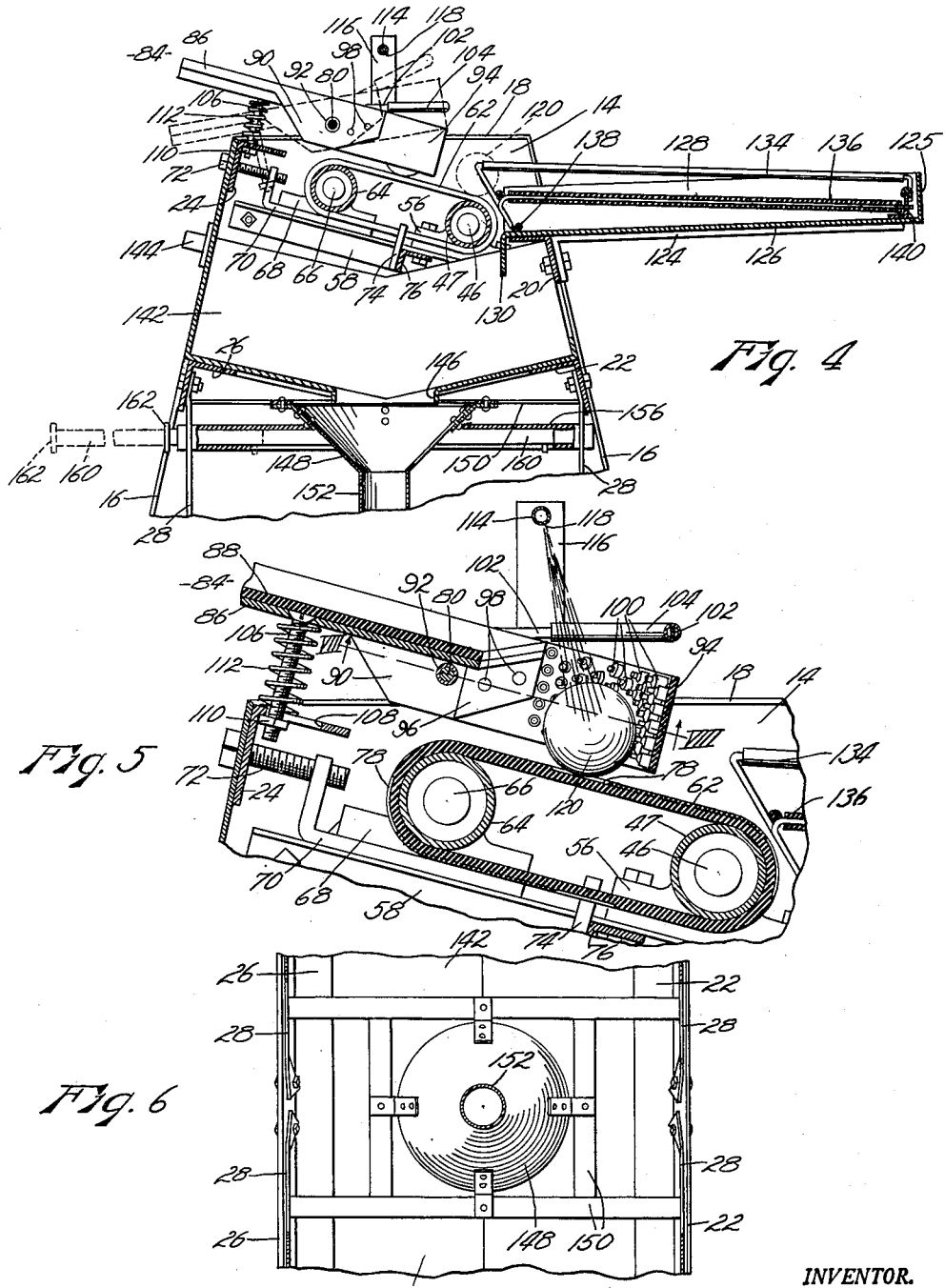
Fig. 4 is a partial vertical section taken on line IV—IV of Figure 1, with the egg scrubbing member shown in the egg holding position in solid lines and in the egg releasing position in dotted lines.
Fig. 5 is an enlarged fragmentary vertical section taken on line V—V of Figure 1.
Fig. 6 is an inverted fragmentary horizontal section taken on line VI—VI of Figure 1.

A spray tube 114, carried by brackets 116 rigidly attached to top flanges 18 of end panels 12 and 14, has holes 118 in spaced relationship therein adapted to direct streams of water upon eggs 120 contained within the loops formed by elastic members 94, as shown in Figure 5. The right end of said spray tube is equipped with a fitting 122 adapted to connect said spray tube with a suitable water supply.

Support members 124 rigidly attached to upper front cross member 20 and extending forwardly therefrom, serve to support a drainage tray 125 having a floor 126 and side portions 128, said floor having a downwardly extending flange 130 at the rearward edge thereof adapted to engage said cross member 20. Said drainage tray is sloped slightly to the rear, and is prevented from moving rearwardly by stops 132 rigidly attached to side portions 128 of said drainage tray and abutting against flanges 16 of end panels 12 and 14. Said drainage tray supports an egg holding rack 134 consisting essentially of a plurality of parallel rubber covered wires 136 suitably fastened together by cross piece 138 at the rearward end thereof and angle iron 140 at the forward edge thereof, said egg holding rack sloping forwardly.

Water draining from eggs supported on belts 62 and from eggs supported on egg holding rack 134, drains into a drain pan 142 which rests on lower cross members 22 and 26 and is manually removable by means of handle 144. Water collecting in drain pan 142 passes through a centrally positioned hole 146 in the bottom thereof and falls into a funnel 148 supported therebeneath by means of suitable bracket 150 rigidly attached to cross members 22 and 26, as shown in Figure 6.

Figure 2:
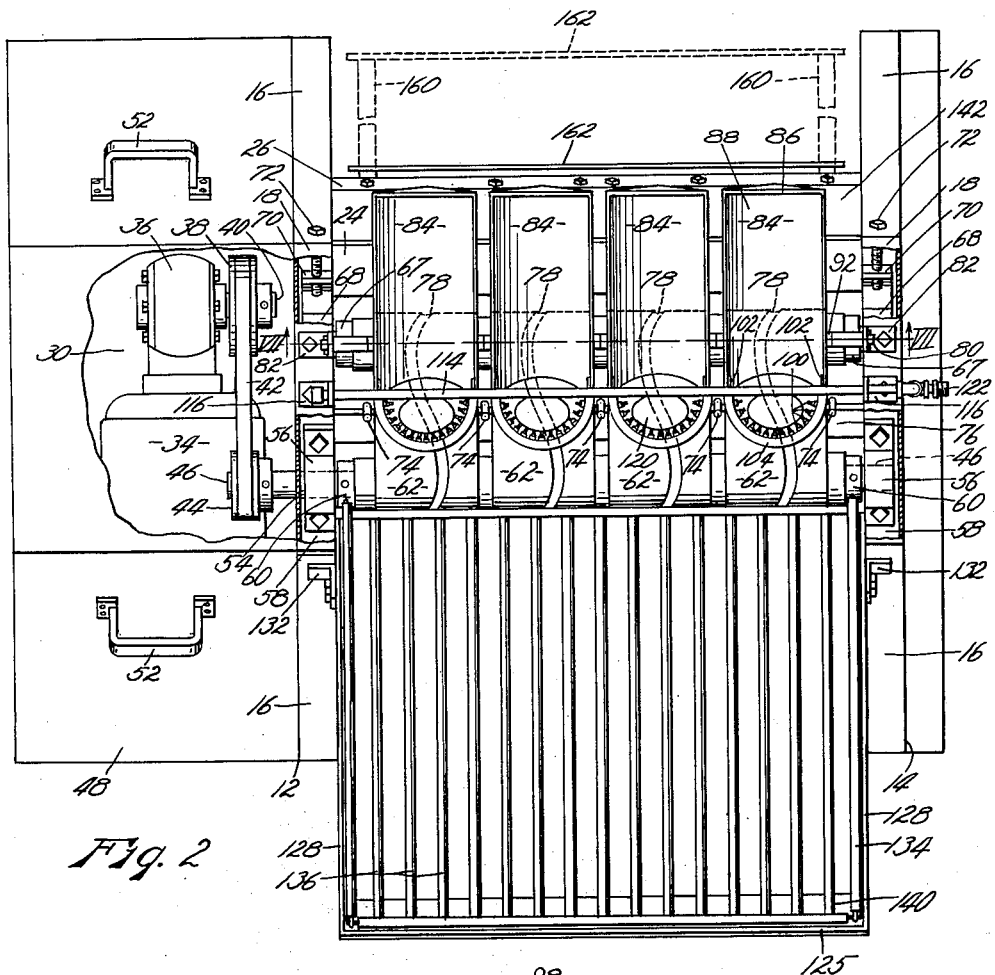
Fig. 2 is a plan view of the egg washer partially broken away to show the motor and belt drive, and showing the crate supporting tray in the extended position in dotted lines.

A drain pipe 152 connected at its upper end with funnel 148 and passing angularly downwardly through hole 154 of right end panel 14 serves to conduct said water to any suitable means of disposal. Tubes 156 rigidly carried by cross members 22 and 26 by means of brackets 158 slidably carry rods 160. The rearward end of said rods projecting out of said tubes are connected by means of bar 162. When said rods are slidably extended to the rear, as shown in dotted lines in Figures 2 and 4, they serve as a means for supporting a crate of unwashed eggs in a position conveniently accessible to the operator of the machine.

The operation of the egg washer is substantially as follows: A hose or other suitable water supply is connected to fitting 122 thereby providing sprays through holes 118 in spray tube 114. Rods 160 are slidably extended from tubes 156 and a crate of unwashed eggs placed thereon. Motor 34 is then turned on, and by means of gear reducer pulley 38, belt 42, pulley 46 and shaft 47, causes belts 62 to turn about shafts 47 and 64, the upper reaches of said belts moving forwardly. An operator standing behind the machine places an egg on tray 86, said egg rolls down the forwardly inclined tray and falls from the forward end of said tray to belt 62 where it is retained by means of elastic scrubbing member 94. Guard rail 102 serves to prevent the possible jumping of said egg over the upper edge of said scrubbing member. Said egg is urged by the travel of said belt against resilient scrubbing fingers 100 of said scrubbing member, and at the same time rotated thereby causing a scrubbing movement between said egg and said scrubbing fingers. Since scrubbing member 94 is highly flexible it conforms easily to the shape of the egg being scrubbed, and thereby thoroughly scrubs all portions of the egg. The serpentine groove 78 formed in the surface of belt 62 causes the egg supported on said belt to oscillate or rock about its major axis thereby subjecting the end surfaces of said egg to the scrubbing action of said scrubbing fingers.

The egg is left in this position until the operator sees that it is sufficiently clean. At this time he manually depresses the rearward end of tray 86 to the position shown in dotted lines in Figure 4. Scrubbing member 94 attached to the forward end of said tray is thereby elevated and the egg is allowed to roll forwardly on the inclined belt to the egg holding rack 134. Since said egg holding rack is forwardly inclined, the egg will continue to roll forward to the forward edge of said rack, thus leaving the rearward portion of said rack for the eggs following. The eggs after washing are allowed to remain on rack 134 until they have thoroughly drained, at which time the operator standing in front of the machine removes them from said rack and places them in any suitable container. Water draining from eggs supported on said egg holding rack falls to drainage tray 125, and since said drainage tray is rearwardly sloped, said water runs rearwardly in said tray and falls to drain pan 142. From there it passes through hole 146 in the bottom of said drain pan to funnel 148 supported therebeneath, and is conducted through drain pipe 152 to any suitable means of disposal.

A feature of the present invention is that each egg is washed individually and within full view of the operator of the machine, thereby rendering it unnecessary to leave any egg in the washer longer than is required for thorough cleaning.

Another feature of the present invention is the simplicity of structure and the ease with which drainage tray 125, and drain pan 142, may be removed for cleaning.

The improvements I claim as new and desire to protect by Letters Patent are:

1. An egg washing machine comprising a frame; a plurality of traveling belts carried by said frame having inclined upper reaches, each adapted to support an egg; means for driving said belts; and a scrubbing member carried by said frame in operative relationship with each of said belts and adapted to retain said egg on said belt, said scrubbing member comprising an essentially U-shaped elastic member having a bight within the path of travel of the egg and a pair of spaced legs parallel with said path of travel whereby to retain said egg therein, the surface of said U-shaped member adjacent said egg having a plurality of resilient scrubbing fingers integrally formed therewith.

2. An egg washing machine comprising a frame, a plurality of traveling belts carried by said frame, each of said belts having an inclined upper reach adapted to support an egg, and having a substantially serpentine groove formed in the surface thereof, means for driving said belts; a pivotally mounted inclined tray member carried by said frame in operative relationship above each of said belts, whereby an egg placed in the upper end thereof will be transferred by gravity to a position on said belt; a substantially U-shaped elastic scrubbing member attached to the lower end of each of said tray members adapted to retain an egg therein at one position on said belt, and against which said egg is rotated by said traveling belt, and having a plurality of resilient scrubbing fingers integrally formed with the surface of said scrubbing member adjacent said egg; means for directing a stream of washing fluid over said eggs as they are supported by said belt; and means for manually tilting said tray members to release said eggs from said scrubbing members, allowing said eggs to roll downwardly along said inclined belt.

3. An egg washing machine comprising a frame; a traveling belt carried by said frame and having an inclined, upper reach adapted to support an egg; means for driving said belt; a tiltable tray member carried by the frame and located at the upper end of the belt, said tray member being normally inclined whereby said egg, placed on the upper end of the tray member, will move by gravity to a predetermined position on said upper reach of the belt; and a scrubbing member fixed to the lower end of the tray member transversely to the direction of travel of the belt, said scrubbing member being adapted to retain the egg at said position on the upper reach of the belt when said egg is moved against the scrubbing member by the belt, and to release the egg when the tray member is tilted to allow the egg to roll downwardly along the belt.

4. An article washing machine comprising a traveling conveyor having an uppermost reach adapted to support an article thereon; and an element overlying the conveyor within the path of travel of said article for restraining advancement of the article by the conveyor in the direction of travel of the latter, said element having means thereon for scrubbing the article as the same is moved relative to the element by frictional contact between the article and the traveling conveyor.

5. An article washing machine comprising a traveling conveyor having an uppermost reach adapted to support an article thereon; and a loop-like element overlying the conveyor within the path of travel of said article for maintaining the article on the conveyor and restraining advancement of the article by the conveyor in the direction of travel of the latter, said element having means thereon for scrubbing the article as the same is moved relative to the element by frictional contact between the article and the traveling conveyor.

6. An article washing machine comprising a traveling conveyor having an uppermost reach adapted to support an article thereon; and an element overlying the conveyor within the path of travel of said article for restraining advancement of the article by the conveyor in the direction of travel of the latter, said element having means thereon for scrubbing the article as the same is moved relative to the element by frictional contact between the article and the traveling conveyor, said element being shiftable toward and away from the conveyor for release of the article.

7. An article washing machine comprising a traveling conveyor having an uppermost reach adapted to support an article thereon; and an element overlying the conveyor within the path of travel of said article for restraining advancement of the article by the conveyor in the direction of travel of the latter, said element having means thereon for scrubbing the article as the same is moved relative to the element by frictional contact between the article and the traveling conveyor, said conveyor having means thereon for enhancing said movement of the article relative to the element.

8. An article washing machine comprising a traveling conveyor having an uppermost reach adapted to support an article thereon; and an element overlying the conveyor within the path of travel of said article for restraining advancement of the article by the conveyor in the direction of travel of the latter, said element having means thereon for scrubbing the article as the same is moved relative to the element by frictional contact between the article and the traveling conveyor, said conveyor having means thereon for rotating the article relative to the element as the conveyor travels.

9. An article washing machine comprising a traveling conveyor having an uppermost reach adapted to support an article thereon; an element overlying the conveyor within the path of travel of said article for restraining advancement of the article by the conveyor in the direction of travel of the latter, said element having means thereon for scrubbing the article as the same is moved relative to the element by frictional contact between the article and the traveling conveyor;

and an inclined tray disposed to guide articles to said reach of the conveyor and into said element by force of gravity.

10. An article washing machine comprising a traveling conveyor having an uppermost reach adapted to support an article thereon; an element overlying the conveyor within the path of travel of said article for restraining advancement of the article by the conveyor in the direction of travel of the latter, said element having means thereon for scrubbing the article as the same is moved relative to the element by frictional contact between the article and the traveling conveyor; and an inclined tray disposed to guide articles to said reach of the conveyor and into said element by force of gravity, said element being shiftable toward and away from the conveyor for release of the article.

11. An article washing machine comprising a traveling conveyor having an uppermost reach adapted to support an article thereon; an element overlying the conveyor within the path of travel of said article for restraining advancement of the article by the conveyor in the direction of travel of the latter, said element having means thereon for scrubbing the article as the same is moved relative to the element by frictional contact between the article and the traveling conveyor; and an inclined tray disposed to guide articles to said reach of the conveyor and into said element by force of gravity, said element being mounted on the tray and shiftable therewith toward and away from the conveyor for release of the article.

12. An article washing machine comprising a traveling conveyor having an uppermost reach adapted to support an article thereon; an element overlying the conveyor within the path of travel of said article for restraining advancement of the article by the conveyor in the direction of travel of the latter, said element having means thereon for scrubbing the article as the same is moved relative to the element by frictional contact between the article and the traveling conveyor, said element being shiftable toward and away from the conveyor for release of the article; and means for yieldably holding the element biased at one end of its path of travel toward the conveyor.

13. An egg washing machine comprising a frame, a plurality of traveling belts carried by said frame, each of said belts having a substantially serpentine groove formed in the surface thereof and being adapted to support an egg thereon, means for driving said belts, and a substantially stationary scrubbing element carried by said frame transversely to the direction of travel of each of said belts against which the egg supported on said belt is urged by said belt, said serpentine groove causing said egg to rock with respect to said scrubbing element, thereby subjecting all parts of the surface of said egg to the action of said scrubbing element.

GORDON W. JOHNSON.

References Cited in the file of this patent

UNITED STATES PATENTS

| Number | Name | Date |
|---|---|---|
| 459,337 | Strong | Sept. 8, 1891 |
| 548,341 | Wilson | Oct. 22, 1895 |
| 734,284 | Stebler | July 21, 1903 |
| 983,691 | De Long | Feb. 7, 1911 |
| 1,205,118 | Stebler | Nov. 14, 1916 |
| 1,392,546 | Williamson | Oct. 4, 1921 |
| 1,676,714 | Smallidge | July 10, 1928 |
| 1,730,157 | McDonald | Oct. 1, 1929 |
| 1,758,011 | Reach | May 13, 1930 |
| 1,776,784 | Cramer | Sept. 30, 1930 |
| 1,920,064 | Cogsdill | July 25, 1933 |
| 2,096,228 | Dudgeon | Oct. 19, 1937 |
| 2,371,867 | Bayles | Mar. 20, 1945 |
| 2,408,648 | Inman | Oct. 1, 1946 |

FOREIGN PATENTS

| Number | Country | Date |
|---|---|---|
| 26,721 | Great Britain | Nov. 17, 1909 |